March 31, 1964 K. EULER 3,127,590

INFORMATION STORAGE ARRANGEMENTS

Filed April 22, 1959 3 Sheets-Sheet 1

Inventor:
KARL EULER

By Toulmin & Toulmin
Attorneys

March 31, 1964 K. EULER 3,127,590

INFORMATION STORAGE ARRANGEMENTS

Filed April 22, 1959 3 Sheets-Sheet 2

Inventor:
KARL EULER

By Toulmin & Toulmin
Attorneys

March 31, 1964 K. EULER 3,127,590

INFORMATION STORAGE ARRANGEMENTS

Filed April 22, 1959 3 Sheets-Sheet 3

Inventor:
KARL EULER

By Toulmin & Toulmin
Attorneys 3,127,590

INFORMATION STORAGE ARRANGEMENTS

Karl Euler, Munich, Germany, assignor to Siemens & Halske Aktiengesellschaft, Berlin and Munich, Germany, a German company Filed Apr. 22, 1959, Ser. No. 808,133
Claims priority, application Germany Apr. 30, 1958
9 Claims. (Cl. 340—174)

Figure 1:
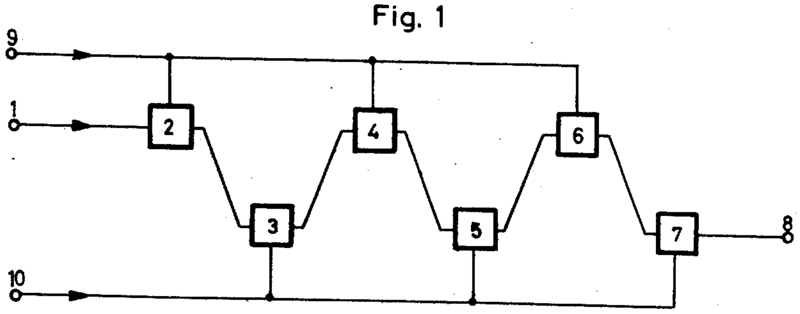

This invention relates to arrangements for storing information for a pre-determined period of time. Such arrangements include a plurality of storage elements, each comprising for instance, a magnetic core with an approximately rectangular hysteresis loop and adapted to store one information unit, for example, in the form of a binary digit. A binary digit may be stored in a magnetic core in the form of positive or negative remanence, the magnetic core being magnetised in one direction or the other in accordance with the polarity of a pulse representing an information unit and remaining after magnetisation at the respective remanence point of the hysteresis loop. Some storage arrangements are designed as shift registers, and in such arrangements an information unit stored in one magnetic core may be shifted to the following magnetic core by means of a shift pulse (transfer pulse). The shift pulse is normally applied to each magnetic core by means of a shift winding, and is operative to magnetise each magnetic core in a pre-determined direction. If the direction in which a magnetic core was magnetised prior to the application of the shift pulse is opposite to the direction of the magnetisation induced by the shift pulse, the direction of magnetisation of the magnetic core is changed by the shift pulse and this change of magnetisation causes a voltage to be induced in any winding on the core. If, on the other hand, the direction in which a core was magnetised is the same as the direction of the magnetisation induced by the shift pulse, there is no change of magnetisation and accordingly no voltage is induced in any winding on that core. In addition to the shift winding each core is provided with an input winding and an output winding. The output winding of each core is connected to the input winding of the next succeeding core and current flow backwards from the input winding of one magnetic core to the output winding of the preceding magnetic core is prevented by suitable circuit means. A magnetic core is magnetised by the current flow from the output winding of the preceding magnetic core, if the direction of magnetisation of the latter has been changed by the shift pulse.

A shift register generally consists of a large number of storage elements and in order that an information unit may be shifted step-by-step from the first storage element to the last storage element by means of the applied shift pulses, the direction of magnetisation of each magnetic core must be changed once during this transfer, so that it delivers the information unit stored in it to the following core. An $n$-stage magnetic shift register requires at least $n$ magnetic cores each of which must be re-magnetised once when an information unit is shifted. The power delivered by the clock pulse generator which provides the shift pulse train must, therefore, be $n$ times as large as the power required for changing the direction of magnetisation of a single magnetic core. The power consumption of long shift registers is, therefore, considerable, and fairly large power output stages are required for the pulse generator.

If a group of information units is fed in sequence into a shift register, the shift register delivers the group at its output in the correct sequence, i.e. in the sequence in which the group was fed into the input of the register.

Thus, each information unit is delayed by the same predetermined time interval.

One type of known shift register will now be described, by way of example, with reference to FIGURE 1 of the accompanying diagrammatic drawings, which is a block diagram of a two-core-per-bit shift register capable of storing $n$ bits simultaneously. Storage and shifting of an information unit, for instance "one" is carried out in such a shift register as follows. If the information unit "one" is applied to the input 1, it is fed into a first store 2. A pulse on a shift pulse line 9 causes the information unit to be transferred to an intermediate store 3. A subsequent shift pulse applied to a shift pulse line 10 causes the information unit to be transferred from the intermediate store 3 to a store 4. This process is repeated from store to store until the information unit has been released from the last store of the shift register. After 2$n$ pulses the information unit "one" is delivered at the output 8 of the shift register.

A store arrangement according to the invention has the same properties as the shift register described above but it works on a completely different principle. In contrast to known shift registers, in a store arrangement according to the invention the individual information units are not shifted step-by-step through the arrangement, but are stored, each in a single storage element, and are released from the same storage elements after the required delay time has expired. As in known shift registers a group of information units is released at the end of the storage time in correct sequence, i.e. in the order in which the individual units were fed into the store arrangement.

The invention consists in an arrangement for storing a pre-determined number of binary digits for a pre-determined period of time, including a number of binary storage elements equal to, or greater than, said pre-determined number, an input terminal common to all said storage elements, an output terminal common to all said storage elements, and a pulse distributor having a number of outputs equal to, or greater than, said pre-determined number, wherein the pulse distributor outputs are so connected to the storage elements that the digits stored in the storage elements are applied to the common output terminal in succession, and wherein means controlled by the pulse distributor outputs are provided for making the common input terminal operative to control the state of each storage element in succession.

The invention also consists in an arrangement for storing binary digits for a pre-determined period of time, including a pulse distributor having $x$ pairs of output terminals; $x$ binary storage elements each associated with one of the pairs of pulse distributor output terminals and each comprising a magnetic core having a substantially rectangular hysteresis loop, a write-in winding, a read-out winding and an output winding; a pair of input terminals, and a pair of output terminals; wherein one of the input terminals is connected to one terminal of each of the pairs of pulse distributor output terminals and also to one end of each of the read-out windings, wherein the other input terminal is connected to one end of each of the write-in windings; wherein the other terminal of each of the pairs of pulse distributor output terminals is connected through a respective resistor to the other end of the associated read-out winding and through a respective rectifier and a bias source, so directed that it makes the rectifier normally non-conductive, to the other end of the write-in winding belonging to the storage element preceding the storage element associated with that pair of pulse distributor output terminals.

The invention also consists in an arrangement for storing binary digits for a pre-determined period of time including a pulse distributor having a plurality of pairs of output terminals, a series of magnetic cores having substantially rectangular hysteresis loops, a write-in winding, a read-out winding, an output winding and an auxiliary winding associated with each magnetic core, a common input terminal, and a common output terminal, wherein the write-in windings are connected in series between the common input terminal and earth, wherein the output windings are connected in series between the common output terminal and earth, and wherein each auxiliary winding is connected in series with the read-out winding associated with the succeeding core to a respective one of the pairs of pulse distributor output terminals.

The invention also consists in an arrangement for storing a plurality of information units for a pre-determined period of time, including a plurality of information-unit-storage elements, an input terminal and an output terminal both common to all said storage elements, a pulse distributor having a plurality of outputs and arranged to deliver pulses successively to said outputs, and a plurality of AND elements, wherein the first inputs of said AND elements are connected in parallel to said common input terminal, wherein the second input of each AND element is connected to a respective one of said pulse distributor outputs, wherein the output of each AND element is connected to the input of a respective one of said storage elements, wherein the outputs of said storage elements, are connected in parallel to said common output terminal, and wherein the release of information stored in each storage element is controlled by a respective one of the pulse distributor outputs.

Figure 2:
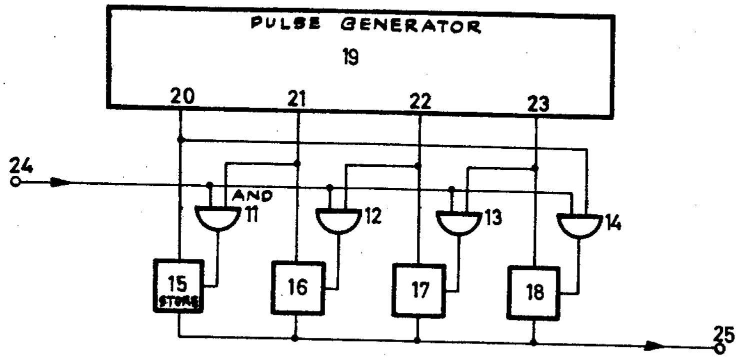
Figure 3:
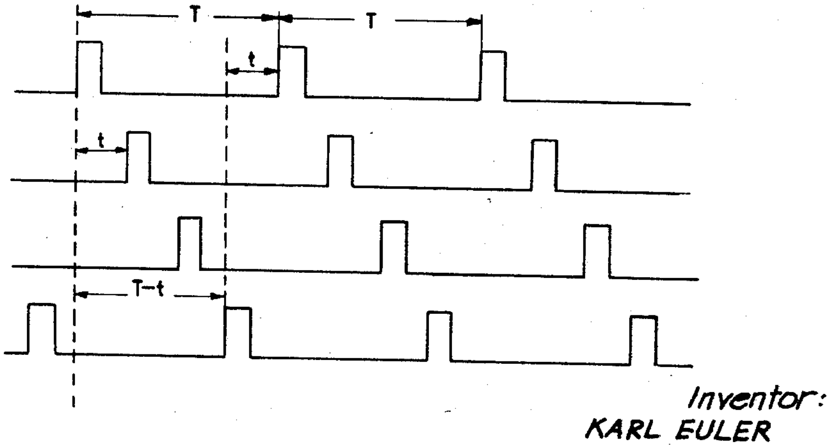
Figure 4:
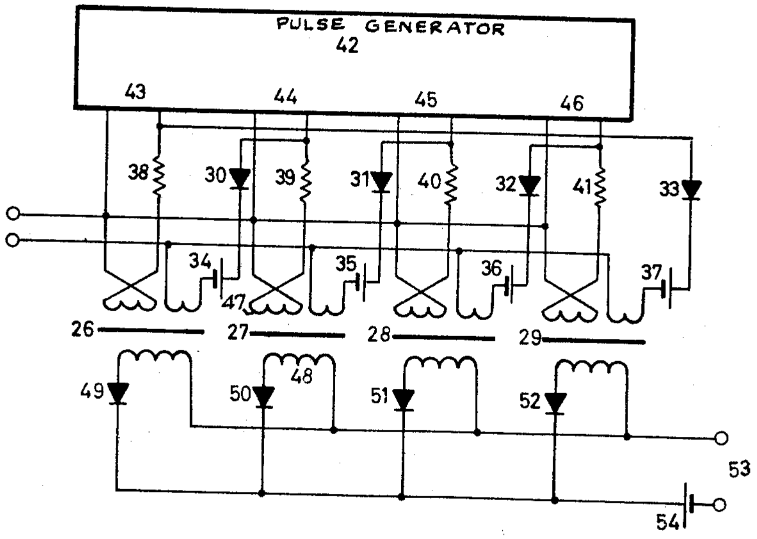
Figure 5:
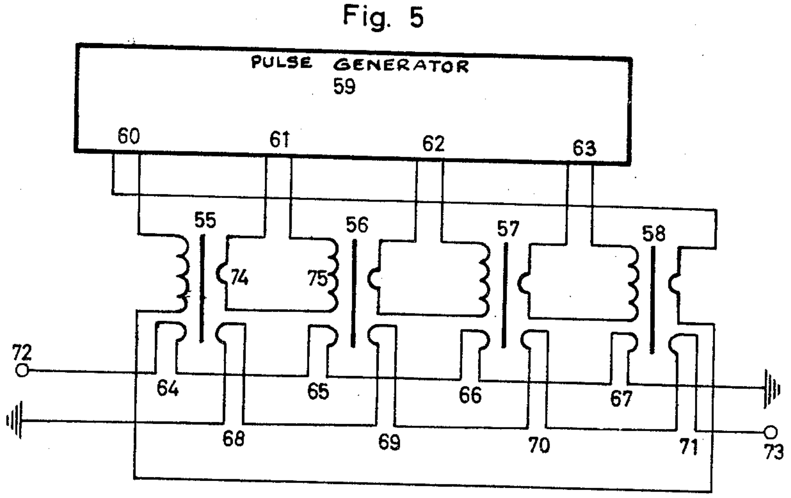
Figure 6:
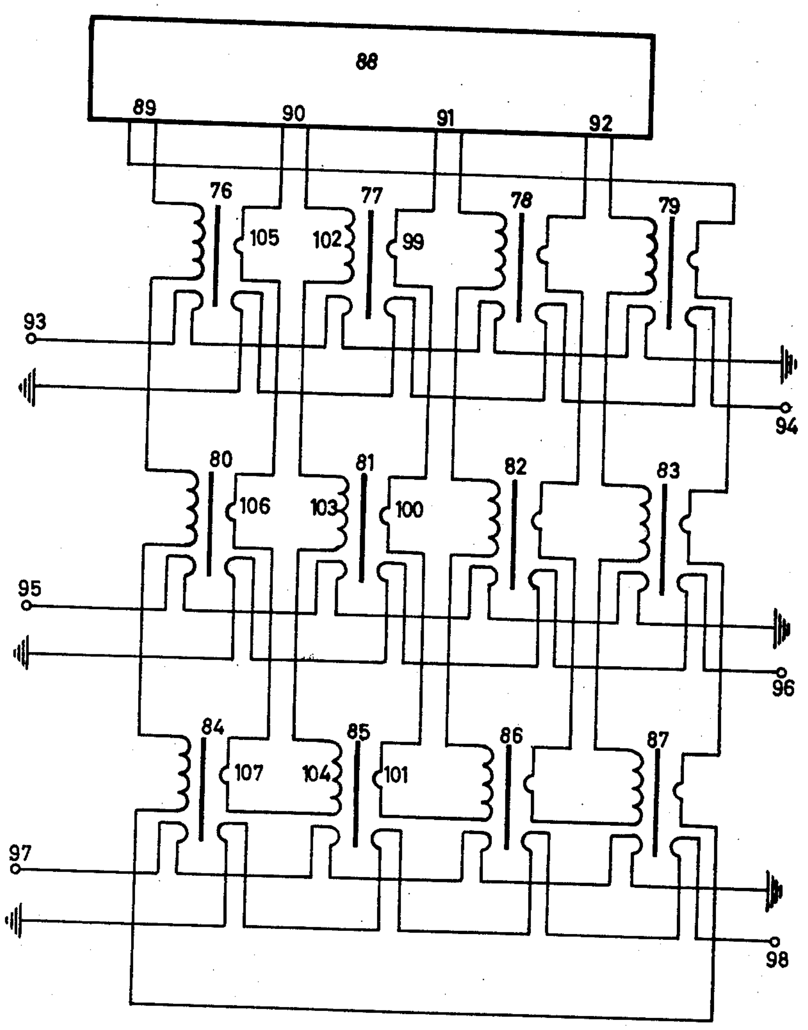

Methods of performing the invention will now be described with reference to FIGURES 2 to 6 of the accompanying diagrammatic drawings in which:

FIGURE 2 is a block diagram of a first embodiment of the invention,

FIGURE 3 is a diagram illustrating the waveforms at various points in the embodiment illustrated in FIGURE 2, FIGURE 4 is a circuit diagram illustrating in more detail one form of the embodiment illustrated in FIGURE 2, FIGURE 5 is a circuit diagram of a second embodiment of the invention, and FIGURE 6 is a circuit diagram illustrating one way in which a number of arrangements of the kind illustrated in FIGURE 5 may be controlled by a single pulse distributor.

The store arrangement illustrated in FIGURE 2 includes four AND elements 11 to 14 and four store elements 15 to 18. Further, a pulse generator 19 is provided which has four outputs 20, 21, 22 and 23. FIGURE 3 illustrates the pulse trains at the four outputs of the pulse generator. Each of the four outputs delivers pulses which follow each other at a time interval T. Corresponding pulses of adjacent outputs, that is, for instance, outputs 20 and 21, are displaced with respect to each other by an interval *t*.

The pulses to be stored are applied to the input terminal 24 in synchronism with the output pulses of the pulse generator 19. It will be assumed that the first pulse applied to the input terminal represents the information unit "one." It will also be assumed that the pulse generator provides a pulse at its output 21 in synchronism with this input pulse. The pulse from the output 21 is applied simultaneously to one input of the gate 11 and to the read-out terminal of the store 16. As the pulse arriving at the input terminal 24 is applied to the other input of the gate 11, the gate 11 is opened. The information unit "one" applied to the common input line, is, therefore, applied to the store element 15 and stored therein. After the time interval *t* the pulse generator provides a pulse at its output 22 and this pulse is applied simultaneously to one input of the gate 12 and to the read-out terminal of the store element 17. It will be assumed that at this instant the input to the arrangement represents the information unit "zero." Under these circumstances there will be no pulse at the input 24. Therefore, gate 12 is not opened and there is no input to the store element 16 so that the information unit "zero" is stored therein. If the same is true at the times of occurrence of the next two pulses, the gates 13 and 14 will remain closed and "zero" will be stored in the store elements 17 and 18. Therefore, the information group 1000 has been stored.

After the time T—*t* has elapsed, the pulse generator delivers at its output 20 a pulse which releases from the store element 15 the information unit "one" and applies it to the output terminal 25. The time T—*t* represents the storage time of the arrangement. Similarly any further information units stored in the store elements 16, 17 and 18 will be released after they have been stored there for an interval T—*t*. In the given example this comprises just three pulse periods. In a store arrangement as shown in FIGURE 2 comprising four AND elements, four stores, and a pulse generator having four outputs, three information units can be stored simultaneously. At the time when an information unit is being stored in the store element 18, the information unit that is stored in store element 15 is released again by the pulse at the pulse generator output 20. Thus $n+1$ gates and $n+1$ store elements are required for the simultaneous storage of $n$ information units.

In exactly the same way as in a known shift register the output terminal can be connected with the input terminal in a store arrangement according to the invention. The information stored in the store arrangement then travels continuously and the arrangement effectively corresponds to a shift register arranged as a ring.

In the embodiment of the invention illustrated in FIGURE 4 each of the store elements includes a magnetic core with an approximately rectangular hysteresis loop. In the drawing four magnetic cores 26, 27, 28 and 29 are illustrated. Each of the AND elements required for the operation of the store arrangement consists of a rectifier and a bias voltage source. The rectifiers are designated by the reference numerals 30, 31, 32 and 33 and the bias voltage sources by the reference numerals 34, 35, 36 and 37.

Normally the gates are closed, since the rectifiers are made non-conductive by the bias sources. However, when a suitable voltage is applied to a rectifier to compensate the bias voltage, the gate that includes that rectifier is opened. A pulse generator 42, which has four outputs 43, 44, 45 and 46, controls the sequence of the storage and release operations. Each of the pulse generator outputs is connected through a resistor 38, 39, 40, or 41, with the read-out winding of a respective one of the store elements. When a pulse appears at one of the pulse generator outputs, a current flows through the associated resistor and the read-out winding that is connected in series with it. This current produces a voltage drop along the resistor, which voltage drop opens the preceding gate by compensating the bias voltage applied to the rectifier of that gate.

It will be assumed that the information unit "one" is stored in the magnetic core 27 and is to be released from this store after the time interval T—*t*. For this purpose a pulse has to appear at the pulse generator output 44, which pulse causes a current to flow through the resistor 39 and the read-out winding 47 of the magnetic core 27. This current causes the direction of magnetisation of the magnetic core 27 to be changed to that which represents "zero." As a result of the change of magnetisation a voltage is induced in the output winding 48, which voltage causes a current to flow through the rectifier 50 to the output terminals 53. The rectifiers 49, 50, 51 and 52, which are connected in series with the output windings of the store elements, serve for decoupling the outputs of the individual store elements.

If the information unit "zero" is stored in any store element, the direction of magnetisation of the magnetic core is the same as the direction of the magnetisation induced by the read-out pulse. Accordingly there is no change in the direction of magnetisation of the core when the read-out pulse is applied. There may, however, be a small change in the magnitude of the magnetisation and this may induce a small voltage in the associated output winding. To prevent this unwanted voltage from reaching the output terminals a battery 54 is arranged in the common output line. This battery delivers a voltage of the same magnitude as the unwanted zero pulses and suppresses them by reason of the fact that it permits pulses to reach the output terminal 53, only if their voltage is greater than the battery voltage.

It is possible to replace the batteries 34, 35, 36 and 37 by a single bias voltage source.

FIGURE 5 shows a particularly advantageous embodiment of the invention, in which each store element is combined with its associated AND element to form a single structural unit. This structural unit is again based on a magnetic core with an approximately rectangular hysteresis loop. Four magnetic cores 55, 56, 57 and 58 are shown. To enable the unit to operate as an AND element as well as a store, each magnetic core is provided with an auxiliary winding in addition to the usual write-in, read-out and output windings. The write-in windings are designated by the reference numerals 64, 65, 66 and 67 and the output windings are designated by the reference numerals 68, 69, 70 and 71. All the write-in windings are connected in series and all the output windings are connected in series. A pulse generator 59 with outputs 60, 61, 62 and 63 serves to control the writing-in and reading-out processes. Each output of the pulse generator is connected to a respective one of the auxiliary windings in series with the read-out winding of the following magnetic core.

As in the case of the arrangement illustrated in the block diagram of FIGURE 2, the pulse trains produced at the various pulse generator outputs are arranged to open the respective AND elements and thus to prepare the associated stores for the storage of information. Thus the output 61 energises the auxiliary winding 74 of the core 55 and at the same time energises the read-out winding 75 of the store 56. The magnitude of the pulses delivered by the pulse generator is such that the current flowing through the auxiliary winding 74, which consists of a single turn, is only one half of that required to change the direction of magnetisation of the magnetic core 55. The common input line is a wire which is passed through all the magnetic cores. The parts of the input line associated with the various cores are designated by the reference numerals 64 to 67. If an information unit "one" is to be stored, a pulse is applied to the input terminal 72 which causes a current to flow along the common input line. The magnitude of this current is one half of that required to change the direction of magnetisation of the core 55. The combined effect of the current from the input terminal 72 and the current from the pulse generator output 61 is to change the core 55 from the remanence state corresponding to the information unit "zero" to the remanence state corresponding to the information unit "one." The current from the pulse generator output 61 also flows through the read-out winding 75, which consists of four turns on the magnetic core 56. The direction in which this winding is wound is such that the current through it changes the direction of magnetisation of the magnetic core 56 to that which corresponds to the "zero" state. Thus, if the information unit "one" has been stored in the magnetic core 56, a voltage is induced in the output winding 69 by the change of direction of the magnetisation of the core, which voltage causes a current to flow to the output terminal 73. If, on the other hand, the magnetic core 56 contains the information unit "zero," the direction of its magnetisation is not changed by the pulse from the pulse generator output 61, since it is already in its "zero" state. Consequently, no flux changes take place in the magnetic core and no voltage is induced in the output winding.

The output line, which is common to all the store cores, consists, like the input line, of a single wire passed through all the magnetic cores. The parts of the line associated with the various cores are denoted in the figure by the numerals 68, 69, 70 and 71.

It should be noted that a pulse is induced in the output winding of a magnetic core when the information unit "one" is written into a store as well as when the information unit "one" is read out. The direction of a pulse induced by writing in, is, however, opposite to that of a pulse induced during reading out. The different pulses can, therefore, be distinguished either by means of their direction or by means of their amplitude. Interference pulses induced, during storage of an information unit "one" in the output windings of those cores whose auxiliary windings are not energised may be suppressed by winding the output windings in the opposite sense on alternate magnetic cores.

As can be seen from the circuit diagram of FIGURE 5, no components other than the magnetic cores and the pulse generator are required for the store arrangement. In particular it is unnecessary as in all known magnetic-core shift registers, to provide rectifiers to prevent each core from having an unwanted effect on the preceding core. Further, it is normally necessary in known magnetic-core shift registers to match the input and output winding of the magnetic cores to the forward resistance of the rectifiers in the circuits between the magnetic cores. Consequently, the magnetic cores must be large enough to accommodate comparatively large input and output windings. In a store arrangement according to the invention, however, since no rectifiers are required in the circuits between the magnetic cores, the windings on the magnetic cores do not have to be matched to the relatively high resistance of the rectifiers and the cores themselves can be made relatively small. The power required to change the direction of magnetisation of such smaller magnetic cores is naturally less than for larger cores. In view of the very low power consumption of a storage arrangement of the kind illustrated in FIGURE 5, it is possible to design a pulse generator for such a store arrangement with transistors only. This has previously been impossible and electronic valves with considerable output power have had to be used.

FIGURE 6, by way of example, shows how three store arrangements according to the invention may be controlled simultaneously from a common pulse generator. The generator is designated by the numeral 88 and is shown with four outputs 89, 90, 91 and 92. The first store arrangement consists of magnetic cores 76, 77, 78 and 79, the second store arrangement consists of magnetic cores 80, 81, 82 and 83, and the third store arrangement consists of magnetic cores 84, 85, 86 and 87. As in the arrangement illustrated in FIGURE 5, the common input and output lines of the individual store arrangements consist merely of wires passed through all the cores of a store arrangement. There are, therefore, no actual input and output windings as such. Information to be stored is applied to an input terminal 93 for the first store arrangement, to an input terminal 95 for the second store arrangement, and to an input terminal 97 for the third store arrangement. After the pre-determined store time T—*t* has elapsed, the information stored in the first store arrangement can be obtained at an output terminal 94, the information stored in the second store arrangement at an output terminal 96, and the information stored in the third store arrangement at an output terminal 98.

The read-out windings and the auxiliary windings of corresponding cores in the three store arrangements are connected in series. Thus, to take the magnetic cores 77, 81 and 85 as an example, it can be seen that the auxiliary windings 99, 100 and 101 as well as the read-out windings 102, 103 and 104 are connected in series. As in the store arrangement illustrated in FIGURE 5, the auxiliary windings of the first cores, that is the windings 105, 106 and 107 are connected in series with the read-out windings of the next cores, that is with the windings 102, 103 and 104. The series combination of all these six windings is connected to the pulse generator output 90. Similar groups of windings are connected to the remaining outputs of the pulse generator. The manner of operation of the arrangement illustrated in FIGURE 6 is essentially the same as that of the store arrangement illustrated in FIGURE 5.

What I claim as my invention and desire to secure by Letters Patent of the United States is:

1. An arrangement for storing a plurality of binary digits for a pre-determined period of time comprising a pulse distributor having a plurality of pairs of output terminals; a plurality of magnetic cores made of material having a substantially rectangular hysteresis loop; a write-in winding, a read-out winding and an output winding on each of said magnetic cores; a pair of input terminals; a pair of output terminals; means connecting one of the terminals of said pair of input terminals to one terminal of each of said pairs of pulse distributor output terminals and also to one end of each of said read-out windings; means connecting the other terminal of said pair of input terminals to one end of each of the write-in windings; means connecting the other terminal of each of said pairs of pulse distributor output terminals through a respective resistor to the other end of a respective one of said read-out windings and through a respective rectifier and a bias source, so directed that it makes the rectifier normally non-conductive, to the other end of a respective one of the write-in windings.

2. An arrangement for storing binary digits for a pre-determined period of time including a pulse distributor having a plurality of pairs of output terminals, a series of magnetic cores having substantially rectangular hysteresis loops, a write-in winding, a read-out winding, an output winding and an auxiliary winding associated with each magnetic core, a common input terminal, and a common output terminal, wherein the write-in windings are connected in series between the common input terminal and earth, wherein the output windings are connected in series between the common output terminal and earth, and wherein each auxiliary winding is connected in series with the read-out winding associated with the succeeding core to a respective one of the pairs of pulse distributor output terminals.

3. An arrangement as claimed in claim 2, wherein the first pair of pulse distributor output terminals is connected to the read-out winding of the first core and the auxiliary winding of the last core in series.

4. An arrangement for storing a plurality of information units for a pre-determined period of time, including a plurality of information-unit-storage elements, an input terminal and an output terminal both common to all said storage elements, a pulse distributor having a plurality of outputs and arranged to deliver pulses successively to said outputs, and a plurality of AND elements, wherein the first inputs of said AND elements are connected in parallel to said common input terminal, wherein the second input of each AND element is connected to a respective one of said pulse distributor outputs, wherein the output of each AND element is connected to the input of a respective one of said storage elements, wherein the outputs of said storage elements are connected in parallel to said common output terminal, and wherein the release of information stored in each storage element is controlled by a respective one of the pulse distributor outputs.

5. An arrangement for storing $n$ binary digits, comprising a series of $(n+1)$ binary storage elements, an input and an output terminal common to all said storage elements, a pulse distributor having $(n+1)$ outputs each associated with one of said binary storage elements, means controlled by each of said pulse distributor outputs for causing the digit stored in the associated storage element to be applied to the common output terminal, and further means controlled by each of said pulse distributor outputs for making the common input terminal operative to control the state of that one of said binary storage elements which precedes the storage elements associated with that pulse distributor output in said series.

6. An arrangement according to claim 5, comprising $(n+1)$ AND elements, wherein the input of each of said binary storage elements is connected to the output of a respective one of said AND elements, wherein one input of each of said AND elements is connected to a respective one of said pulse distributor outputs, and wherein the other input of each of said AND elements is connected to the common input terminal.

7. An arrangement for storing $n$ binary digits, comprising a series of $(n+1)$ magnetic cores, a common input and a common output terminal, a pulse distributor having a series of $(n+1)$ outputs each associated with one of said magnetic cores, a write-in winding, a read-out winding and an output winding on each of said magnetic cores, means connecting each of said pulse distributor outputs to the read-out winding of the associated magnetic core, $(n+1)$ AND elements, means connecting the output of each AND element to the write-in winding of a respective one of said magnetic cores, means connecting one input of each AND element to the common input terminal, means connecting each of said pulse distributor outputs to the other input terminal of that AND element whose output is connected to the write-in winding of the magnetic core preceding the magnetic core associated with that pulse distributor output in said series, and means connecting the output windings of all the magnetic cores to said common output terminal.

8. An arrangement for storing binary digits for a pre-determined period of time, comprising a pulse distributor having a series of pairs of output terminals; a series of magnetic cores each associated with one of the pairs of output terminals; a write-in winding, a read-out winding and an output winding on each of said magnetic cores; a pair of input terminals; a pair of output terminals; means connecting one of said input terminals to one terminal of each of said pairs of pulse distributor output terminals and also to one end of each of said read-out windings; means connecting the other of said input terminals to one end of each of said write-in windings; means including a rectifier and a bias source connecting the other terminal of each of said pairs of pulse distributor output terminals to the other end of the write-in winding on that one of the magnetic cores which precedes the associated magnetic core in the series; means including a resistor connecting said other terminal of each of the pairs of pulse distributor output terminals to the other end of the read-out winding on the associated magnetic core, means connecting one end of each of the output windings to one of the output terminals; and means including an individual rectifier and a common bias source connecting the other end of each of said output windings to the other of said output terminals.

9. An arrangement according to claim 8, wherein said other terminal of the first pair of pulse distributor output terminals is connected through a rectifier and a bias source to the other end of the last write-in winding.

References Cited in the file of this patent

UNITED STATES PATENTS

| | | |
|---|---|---|
| 2,852,699 | Ruhman | Sept. 10, 1958 |
| 2,931,014 | Buchholz | Mar. 29, 1960 |
| 2,983,904 | Moore | May 9, 1961 |